(12) United States Patent
Sachot et al.

(10) Patent No.: US 8,318,621 B2
(45) Date of Patent: Nov. 27, 2012

(54) SILICO-SODO-CALCIC GLASS SHEET

(75) Inventors: Dominique Sachot, Ozaoire la Ferriere (FR); Octavio Cintora-Gonzalez, Taverny (FR)

(73) Assignee: Saint-Gobain Glass France, Courbevoie (FR)

( * ) Notice: Subject to any disclaimer, the term of this patent is extended or adjusted under 35 U.S.C. 154(b) by 285 days.

(21) Appl. No.: 12/676,999

(22) PCT Filed: Sep. 19, 2008

(86) PCT No.: PCT/FR2008/051686
§ 371 (c)(1),
(2), (4) Date: Mar. 8, 2010

(87) PCT Pub. No.: WO2009/047462
PCT Pub. Date: Apr. 16, 2009

(65) Prior Publication Data
US 2010/0179048 A1 Jul. 15, 2010

(30) Foreign Application Priority Data
Sep. 21, 2007 (FR) ...................... 07 57758

(51) Int. Cl.
*C03C 3/087* (2006.01)
*H01L 31/00* (2006.01)
(52) U.S. Cl. ............... 501/70; 501/64; 501/65; 501/66; 501/67; 136/252; 136/256

(58) Field of Classification Search .............. 501/64–67, 501/70; 136/252, 256
See application file for complete search history.

(56) References Cited

U.S. PATENT DOCUMENTS

| | | | | |
|---|---|---|---|---|
| 4,015,966 A * | 4/1977 | Weaver | ......................... | 65/99.4 |
| 4,812,423 A * | 3/1989 | Kodama et al. | ................. | 501/55 |
| 6,831,030 B2 * | 12/2004 | Koyama et al. | ................. | 501/70 |
| 6,844,280 B2 | 1/2005 | Koyama et al. | | |
| 7,276,289 B2 * | 10/2007 | Lu et al. | ...................... | 428/432 |
| 2005/0054514 A1 * | 3/2005 | Ishioka et al. | ................. | 501/65 |
| 2006/0006786 A1 * | 1/2006 | Fechner et al. | ................ | 313/493 |
| 2008/0185041 A1 * | 8/2008 | Sharma et al. | ................ | 136/261 |
| 2008/0259602 A1 * | 10/2008 | Fechner et al. | ................ | 362/247 |
| 2010/0304949 A1 * | 12/2010 | Sachot et al. | ................... | 501/70 |
| 2012/0021185 A1 * | 1/2012 | Sachot et al. | ................. | 428/174 |

FOREIGN PATENT DOCUMENTS

| | | |
|---|---|---|
| EP | 0 738 243 | 9/1998 |
| JP | 2002 293571 | 10/2002 |
| JP | 2002293571 A * | 10/2002 |

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The invention relates to a glass sheet, the composition of which is of the soda-lime-silica type and comprises the following constituents in contents varying within the weight limits defined below:
  $Fe_2O_3$ (total iron) 0 to 0.02%; and
  $WO_3$ 0.1 to 2%.

16 Claims, No Drawings

SILICO-SODO-CALCIC GLASS SHEET

CROSS-REFERENCE TO RELATED APPLICATIONS

This application is a National Stage of PCT/FR08/051686 filed Sep. 19, 2008 and claims the benefit of FR 0757758 filed Sep. 21, 2007.

The present invention relates to a glass sheet having high transmission properties for visible and infrared radiation.

Although it is not limited to such an application, the invention will be more particularly described with reference to glass sheets capable of being obtained by the "float" process, consisting in pouring the molten glass over a bath of molten metal (in particular tin).

In applications where the glass is used in the form of a glass sheet covering photovoltaic cells or solar cells, it is essential that the glasses used have an extremely high transmission of visible and/or infrared radiation, in particular greater than 90%, because the quantum efficiency of the cell may be strongly affected by an even very low reduction in the transmission, by the glass, of visible or infrared radiation.

The transmission in the visible or infrared range is generally expressed in the form of a transmission factor that integrates, over a certain portion of the spectrum, the transmission for each wavelength taking into account a given spectral distribution and optionally the sensitivity of the human eye. In order to quantify the transmission of the glass in the visible range, a light transmission factor is thus defined, referred to as light transmission, often abbreviated to "$T_L$," calculated between 380 and 780 mm and related to a glass thickness of 3.2 mm, while taking into consideration the illuminant D65 as defined by the ISO/CIE 10526 standard and the CIE 1931 standard colorimetric observer as defined by the ISO/CIE 10527 standard. To quantify the transmission of the glass in the range encompassing the visible and solar infrared (also known as "near infrared") ranges, an energy transmission factor is defined, known as "energy transmission", abbreviated to "$T_E$", calculated according to the ISO 9050 standard and related to a glass thickness of 3.2 mm.

It is known to decrease the total iron oxide content in the glass as much as possible in order to attain values of $T_L$ and $T_E$ greater than 90%. Iron oxide, present as an impurity in most of the natural raw materials used in the glass industry (sand, feldspar, limestone, dolomite, etc.), absorbs both in the visible and near ultraviolet range (absorption due to the ferric ion $Fe^{3+}$) and especially in the visible and near infrared range (absorption due to the ferrous ion $Fe^{2+}$). With ordinary natural raw materials, the total weight content of iron oxide is around 0.1% (1000 ppm). Transmissions of more than 90% require, however, lowering the content of iron oxide to less than 0.02% or 200 ppm, or even less than 0.01% (100 ppm), which makes it necessary to choose particularly pure raw materials and increases the cost of the final product.

To increase the transmission of the glass even further, it is also known to reduce the content of ferrous iron in favor of the content of ferric iron, therefore to oxidize the iron present in the glass. Thus glasses having the lowest possible "redox", ideally zero or almost zero, are targeted, the redox being defined as being the ratio of the weight content of FeO (ferrous iron) to the weight content of total iron oxide (expressed in the $Fe_2O_3$ form). This number may vary between 0 and 0.9, zero redoxes corresponding to a completely oxidized glass.

Various solutions have been proposed for oxidizing the iron oxide as much as possible. It is for example known from U.S. Pat. No. 6,844,280 to add cerium oxide ($CeO_2$) to the glass. Cerium oxide is however capable of being the cause of the process known as "solarization", in which the transmission of the glass greatly decreases after absorption of ultraviolet radiation. It is also known to add to the glass antimony oxide ($Sb_2O_3$) or arsenic oxide ($As_2O_3$), oxides that are conventionally used as refining agents for glass and which have the particularity of oxidizing the iron. The use of $Sb_2O_3$ is, for example, described in Application US 2006/249199. These oxides have however proved to be incompatible with the float process of the glass. It would appear that, under the reducing conditions necessary for the non-oxidation of the tin bath, some of these oxides volatilize then condense on the glass sheet being formed, generating an undesirable haze.

The objective of the present invention is therefore to overcome the aforementioned drawbacks and to provide novel glass sheets for which the light and energy transmission is very high, enabling them to be used in photovoltaic cells.

For this purpose, one subject of the invention is a glass sheet, the chemical composition of which is of the soda-lime-silica type and comprises the following constituents in contents varying within the weight limits defined below:

| | |
|---|---|
| $Fe_2O_3$ (total iron) | 0 to 0.02%; and |
| $WO_3$ | 0.1 to 2%. |

$Fe_2O_3$ and $WO_3$ respectively represent the total contents of iron and tungsten oxides in the glass, regardless of the degree of oxidation of their respective ions.

The glass sheet is, in particular, capable of having been obtained by a float process on a bath of molten tin.

The expression "composition of soda-lime-silica type" is understood to mean a composition comprising silica ($SiO_2$) as a forming oxide and sodium oxide (soda, $Na_2O$) and calcium oxide (lime, CaO). This composition preferably comprises the following constituents in contents varying within the weight limits defined below:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0. |

The presence of iron in a glass composition may result from the raw materials, as impurities, or from a deliberate addition aiming to color the glass. It is known that iron exists in the structure of the glass in the form of ferric ions ($Fe^{3+}$) and ferrous ions ($Fe^{2+}$). The presence of $Fe^{3+}$ ions gives the glass a very slight yellow coloration and makes it possible to absorb ultraviolet radiation. The presence of $Fe^{2+}$ ions gives the glass a more pronounced blue-green coloration and induces an absorption of infrared radiation. The increase in the content of iron in its two forms intensifies the absorption of radiation at the ends of the visible spectrum, this effect taking place to the detriment of the light transmission.

In the present invention, the $Fe_2O_3$ (total iron) content is preferably less than or equal to 0.015%, in particular 0.01%, in order to limit the light and energy transmission.

Tungsten oxide has proved capable of oxidizing the iron, thus decreasing the content of $Fe^{2+}$ ions. This effect has never, to the knowledge of the inventors, been highlighted, and would appear to exist only in the case of glasses that are very poor in iron oxide. Moreover, this oxide is perfectly compatible with the glass float process and the glass thus produced does not exhibit solarization.

In order to maximize its effect, the $WO_3$ content is preferably greater than or equal to 0.2%, or even 0.3% and even 0.4% or 0.5%. It would appear, however, that the oxidation effect saturates beyond a certain value. Taking into account the cost of this oxide, its content is preferably less than or equal to 0.9%, or even 0.8% and even 0.7%. A content of around 0.5% is preferred. Beyond 2% of $WO_3$, a phase separation is observed.

The $WO_3$ content is preferably between 0.2 and 1%, in particular between 0.3 and 0.7% or between 0.3 and 0.5%. A content of around 0.35% is preferred.

The redox, which is an indicator of the oxidation-reduction state of the glass, is preferably less than or equal to 0.1, or even 0.07 and even 0.05, in order to maximize the transmission of the glass.

The glass sheet according to the invention preferably has, for a thickness of 3.2 mm, a light transmission $T_L$ of at least 91%, in particular 91.1%, even 91.2% or 91.3% and even 91.4% or 91.5%.

Advantageously, it has, still for a thickness of 3.2 mm, an energy transmission $T_E$ of at least 91%, in particular 91.5%, or even 91.2% or 91.3% and even 91.4% or 91.5%.

These values are close to the theoretical limit for a glass free of antireflection treatments, since the reflection factor of one face of soda-lime-silica glass is around 4%, i.e. 8% when both faces are taken into account. A soda-lime-silica glass free of antireflection treatments cannot therefore have a transmission greater than 92%.

Within the context of the present invention, one particularly preferred composition comprises the following constituents in contents varying within the weight limits defined below:

| | |
|---|---|
| $Fe_2O_3$ (total iron) | 0.010 to 0.015%; and |
| $WO_3$ | 0.3 to 0.5%. |

Such a composition makes it possible to obtain glasses of very low redox (0.07 or less), or even lower when the $K_2O$ content of the matrix is greater than or equal to 1.5%, in particular 2%, or even 3% and even 4%, as explained below.

It is recommended here that the soda-lime-silica glass composition may comprise, besides the inevitable impurities contained, in particular, in the raw materials, a small proportion (up to 1%) of other constituents, for example agents that aid the melting or refining of the glass ($SO_3$, Cl, etc.), or else elements that originate from the dissolution of the refractories that are used in the construction of the furnaces (for example, $ZrO_2$). For reasons already mentioned, the composition according to the invention preferably does not comprise oxides such as $Sb_2O_3$, $As_2O_3$ or $CeO_2$. Preferably, the $MoO_3$ content is zero.

The composition of the glass sheet according to the invention preferably does not comprise any agent that absorbs visible or infrared radiation (especially for a wavelength between 380 and 1000 nm) other than those already cited. In particular, the composition according to the invention preferably does not contain agents chosen from the following agents, or any of the following agents: transition element oxides such as CoO, CuO, $Cr_2O_3$, $MnO_2$, rare-earth oxides such as $CeO_2$, $La_2O_3$, $Nd_2O_3$, or else coloring agents in the elemental state such as Se, Ag, Cu. These agents very often have a very powerful undesirable coloring effect, which is manifested at very low contents, sometimes of around a few ppm or less (1 ppm=0.0001%). Their presence thus very strongly decreases the transmission of the glass. For certain applications, in particular in furniture, it has however possible to add a very small amount of a coloring oxide, in particular cobalt oxide in a content less than 1 ppm, to give a slight visible coloration at the edge of the glass.

In the glass sheets according to the invention, silica is generally kept within narrow limits for the following reasons. Above 75%, the viscosity of the glass and its ability to denitrify increase greatly, which makes it more difficult to melt and flow on the bath of molten tin. Below 60%, in particular 64%, the hydrolytic resistance of the glass decreases rapidly.

Alumina, $Al_2O_3$, plays a particularly important role in the hydrolytic resistance of the glass. When the glass according to the invention is intended to be used in hot and humid environments, the alumina content is preferably greater than or equal to 1%.

The alkali metal oxides $Na_2O$ and $K_2O$ facilitate the melting of the glass and allow its viscosity to be adjusted at high temperatures so as to keep it close to that of a standard glass. $K_2O$ may be used up to 10%, as the problem of the high cost of the composition is faced above this content. Moreover, the increase in the percentage of $K_2O$ can be accomplished, essentially, only to the detriment of $Na_2O$, which contributes to increasing the viscosity. The sum of the $Na_2O$ and $K_2O$ contents, expressed as percentages by weight, is preferably equal to or greater than 10% and advantageously less than 20%. If the sum of these contents is greater than 20% or if the $Na_2O$ content is greater than 18%, the hydrolytic resistance is greatly reduced. The glasses according to the invention are preferably free of lithium oxide $Li_2O$ due to its high cost.

It is apparent to the inventors that the increase in the $K_2O$ content (especially to the detriment of the $Na_2O$ content) would make it possible to obtain even higher transmissions. This phenomenon could be due to a modification of the chemical environment of the iron atoms.

Therefore, the $K_2O$ content is preferably greater than or equal to 1.5%, or even 2%, in particular 3%, and even 4% or 5%. For reasons mainly linked to the cost, the $K_2O$ content is preferably less than or equal to 8%, or even 7%. A content between 3% and 5% has proved particularly advantageous.

Alkaline-earth metal oxides make it possible to adapt the viscosity of the glass to the production conditions.

MgO may be used up to around 10% and its omission may be at least partly compensated for by an increase in the $Na_2O$ and/or $SiO_2$ content. Preferably, the MgO content is less than 5%. Low MgO contents furthermore make it possible to reduce the number of raw materials needed for melting the glass.

BaO has a much smaller influence than CaO and MgO on the viscosity of the glass and the increase in its content is essentially accomplished to the detriment of the alkali metal oxides, of MgO and especially of CaO. Any increase in BaO contributes to increasing the viscosity of the glass at low temperatures. Preferably, the glasses according to the invention are free of BaO and also of strontium oxide (SrO), these elements having a high cost.

The glass composition according to the invention is capable of being melted under the conditions for producing glass intended for forming flat glass by the drawing, rolling or, preferably, floating techniques. Melting generally takes place in flame-fired furnaces, optionally provided with electrodes for heating the glass in the bulk, by passing an electric current between the two electrodes. To facilitate the melting operation, and especially to make the latter mechanically advantageous, the glass composition advantageously has a temperature corresponding to a viscosity η such that log η=2 that is less than 1500° C. Also preferably, the temperature corresponding to the viscosity η such that log η=3.5 (denoted by T(log η=3.5)) and the liquidus temperature (denoted by $T_{liq}$) satisfy the equation:

$$T(\log \eta=3.5)-T_{liq}>20°\ C.$$

and better still:

$$T(\log \eta=3.5)-T_{liq}>50°\ C.$$

In order to further improve the light and energy transmission of the glass, the glass sheet according to the invention may be coated on at least one of its faces with an antireflection coating. This coating may comprise one layer (for example, based on porous silica having a low refractive index) or several layers: in the latter case a stack of layers based on dielectric alternating layers of low and high refractive indices and finishing with a layer having a low refractive index is preferred. It may especially be a stack described in Application WO 01/94989 or WO 2007/077373.

Still in order to increase the light and energy transmission, the surface of the glass sheet may be textured, for example having patterns (in particular pyramid-shaped patterns), as described in Applications WO 03/046617, WO 2006/134300, WO 2006/134301 or else WO 2007/015017.

Another subject of the invention is the use of the glass sheet according to the invention in photovoltaic cells, solar cells, flat or parabolic mirrors for concentrating solar energy, or else diffusers for backlighting display screens of the LCD (liquid crystal display) type. The glass sheet according to the invention may also be used for interior applications (partitions, furniture, etc.) or in electrical goods (refrigerator shelves, etc.). It may also be used in displays or flat lamps based on organic light-emitting diodes.

Generally, another subject of the invention is a photovoltaic cell, a solar cell or a flat or parabolic mirror for concentrating solar energy, or else a diffuser for backlighting display screens of the LCD type comprising at least one glass sheet of which the light transmission $T_L$ is at least 91%, or even 91.5% and/or of which the energy transmission $T_E$ is at least 91%, or even 91.4% (in both cases in the absence of any antireflection treatment) for a thickness of 3.2 mm, independently of the composition of the glass. The glass sheet is preferably capable of having been obtained by a float process on a bath of molten tin. Specifically, it appears that the invention has made it possible, for the first time, to obtain such performances.

The present invention will be better understood on reading the detailed description below of nonlimiting exemplary embodiments illustrated by table 1.

Indicated in these examples are the values of the following optical properties calculated for a glass thickness of 3.2 mm from experimental spectra:
- the energy transmission ($T_E$) calculated according to the ISO 9050 standard;
- the overall light transmission factor ($T_L$), calculated between 380 and 780 mm, taking into consideration the illuminant D65 as defined by the ISO/CIE 10526 standard and the CIE 1931 standard colorimetric observer as defined by the ISO/CIE 10527 standard.

Also indicated in table 1 are the weight contents of potassium, iron and tungsten oxides, measured by chemical analysis.

The compositions appearing in table 1 are produced from a matrix which comprises the following oxides, the contents of which are expressed in percentages by weight:

| | |
|---|---|
| $SiO_2$ | 71.0% |
| $Al_2O_3$ | 0.8% |
| CaO | 9.5% |
| MgO | 4.0% |
| $Na_2O$ | 13.75% |

Added to this matrix is a given amount of $K_2O$, in substitution for $Na_2O$.

TABLE 1

| | C1 | 1 | 2 | 3 | 4 | 5 |
|---|---|---|---|---|---|---|
| $K_2O$ (%) | 0.35 | 0.35 | 2.0 | 0.35 | 5.0 | 3.5 |
| $Fe_2O_3$ (%) | 0.01 | 0.01 | 0.01 | 0.01 | 0.01 | 0.01 |
| $WO_3$ (%) | 0 | 0.2 | 0.2 | 0.5 | 0.5 | 0.35 |
| $T_L$ (%) | 90.7 | 91.2 | 91.4 | 91.3 | 91.5 | 91.5 |
| $T_E$ (%) | 90.5 | 90.9 | 91.1 | 91.0 | 91.4 | 91.4 |

The composition C1 is a comparative example, that does not comprise tungsten oxide. The introduction of this oxide makes it possible to substantially increase the light and energy transmissions of the glass, up to values greater than or equal to 91%. The use, in examples 2, 4 and 5, of a matrix containing more than 1.5% of $K_2O$, even makes it possible to attain values of 91.5%.

Example 5 is particularly advantageous since it has very high transmission values for a moderate content of $WO_3$ and $K_2O$.

None of the glasses obtained exhibits solarization after an accelerated test of 100 hours under ultraviolet radiation.

The invention claimed is:

1. A glass sheet comprising a soda-lime-silica composition in weight percentages:

| | |
|---|---|
| $B_2O_3$ | 0 to 5% |
| $Fe_2O_3$ (total iron) | 0 to 0.02%; and |
| $WO_3$ | 0.1 to 2%. |

2. The glass sheet as claimed in claim 1, which comprises in weight percentages:

| | |
|---|---|
| $SiO_2$ | 60-75% |
| $Al_2O_3$ | 0-10% |
| $B_2O_3$ | 0%, |
| CaO | 5-15% |
| MgO | 0-10% |
| $Na_2O$ | 5-20% |
| $K_2O$ | 0-10% |
| BaO | 0-5%. |

3. The glass sheet as claimed in claim 1, wherein the $Fe_2O_3$ (total iron) content is less than or equal to 0.015%.

4. The glass sheet as claimed in claim 1, wherein the $WO_3$ content is between 0.3 and 0.7%.

5. The glass sheet as claimed in claim 1, wherein the redox is less than or equal to 0.1.

6. The glass sheet as claimed in claim 1, having, for a thickness of 3.2 mm, a light transmission $T_L$ of at least 91%.

7. The glass sheet as claimed in claim 1, having, for a thickness of 3.2 mm, an energy transmission $T_E$ of at least 91%.

8. The glass sheet as claimed in claim 1, such that the $K_2O$ content is greater than or equal to 1.5%.

9. The glass sheet as claimed in claim 1, the composition of which does not contain any other agent that absorbs visible and infrared radiation.

10. The glass sheet as claimed in claim 9, the composition of which does not contain agents selected from the group consisting of CoO, CuO, $Cr_2O_3$ $MnO_2$, $CeO_2$, $La_2O_3$, $Nd_2O_3$, Se, Ag, and Cu.

11. The glass sheet as claimed in claim 1, the composition of which does not contain the oxides $Sb_2O_3$, $As_2O_3$ or $CeO_2$.

12. A diffuser comprising the glass sheet as claimed in claim 1.

13. A method of backlighting the display screen of an LCD comprising backlighting the display screen of an LCD with the diffuser as defined in claim 12.

14. A photovoltaic cell comprising a glass sheet comprising in weight percentages a soda-lime-silica composition,

| | |
|---|---|
| $Fe_2O_3$ (total iron) | 0 to 0.02%; and |
| $WO_3$ | 0.1 to 2%. |

15. A solar cell comprising a glass sheet comprising in weight percentages a soda-lime-silica composition,

| | |
|---|---|
| $Fe_2O_3$ (total iron) | 0 to 0.02%; and |
| $WO_3$ | 0.1 to 2%. |

16. A flat or parabolic mirror that concentrates solar energy comprising a glass sheet comprising in weight percentages a soda-lime-silica composition,

| | |
|---|---|
| $Fe_2O_3$ (total iron) | 0 to 0.02%; and |
| $WO_3$ | 0.1 to 2%. |

* * * * *